United States Patent
Mohr (10) Patent No.: US 7,712,117 B1
(45) Date of Patent: *May 4, 2010

(54) MULTIPLE CHANNEL PRESENTER

(75) Inventor: Grant Mohr, San Bruno, CA (US)

(73) Assignee: Microsoft Corporation, Redmond, WA (US)

( * ) Notice: Subject to any disclaimer, the term of this patent is extended or adjusted under 35 U.S.C. 154(b) by 1879 days.

This patent is subject to a terminal disclaimer.

(21) Appl. No.: 10/260,075

(22) Filed: Sep. 27, 2002

(51) Int. Cl.
H04N 5/445 (2006.01)
(52) U.S. Cl. .................. 725/41; 348/563; 348/564; 348/565; 348/584; 725/43; 725/44; 715/792
(58) Field of Classification Search .............. None
See application file for complete search history.

(56) References Cited

U.S. PATENT DOCUMENTS

| | | | | |
|---|---|---|---|---|
| 5,671,019 A | * | 9/1997 | Isoe et al. ............ | 348/565 |
| 6,285,408 B1 | * | 9/2001 | Choi et al. ............ | 348/555 |
| 6,563,515 B1 | * | 5/2003 | Reynolds et al. ...... | 715/721 |
| 6,732,371 B1 | * | 5/2004 | Lee et al. .............. | 725/41 |
| 7,373,650 B1 | * | 5/2008 | Rodriguez et al. ..... | 725/41 |

* cited by examiner

Primary Examiner—Hunter B. Lonsberry
Assistant Examiner—Oschta Montoya
(74) Attorney, Agent, or Firm—Lee & Hayes, PLLC (57) ABSTRACT

An implementation of a technology, described herein, for multiple channel display on a multimedia presentation system. One implementation, described herein, simultaneously presents video content, audio-based content, and/or electronic program guide (EPG) data of multiple television channels. With this implementation, a user may greatly increase his speed and efficiency when channel surfing. This abstract itself is not intended to limit the scope of this patent. The scope of the present invention is pointed out in the appending claims.

7 Claims, 6 Drawing Sheets

MULTIPLE CHANNEL PRESENTER

TECHNICAL FIELD

This invention generally relates to a technology for multiple channel display on a multimedia presentation system.

BACKGROUND

To find out what television broadcast programming is currently available, many people consult a printed guide. Some view a broadcast television guide or use an interactive program guide. Still others enjoy "channel surfing."

"Channel Surfing" is a well-known and popular term in the common contemporary vernacular. In general, channel surfing is when one frequently switches from one channel (e.g., a television station) to another on a television set. Typically, the purpose may be to either to search for an interesting program or to keep track of several programs at once. This practice became widespread with the use of remote-control devices for changing channels while remaining seated some distance from the television set.

For a digital set-top boxes (such as digital satellite receivers and digital cable receivers), tuning is often slow compared to analog tuning. Consequently, channel surfing speed with digital tuning is slower than surfing with analog tuning.

Furthermore, with the large amount of channels, it is difficult for a user to keep track and/or discover what programs are being broadcast across all of the available channels at any given time.

Therefore, it is a challenge to improve the user's channel surfing experience.

SUMMARY

Described herein is a technology for multiple channel display on a multimedia presentation system.

One implementation, described herein, simultaneously presents video content, audio-based content, and/or electronic program guide (EPG) data of multiple television channels. With this implementation, a user may greatly increase his speed and efficiency when channel surfing.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explaining the present invention. Furthermore, for ease of understanding, certain method steps are delineated as separate steps; however, these separately delineated steps should not be construed as necessarily order dependent in their performance.

The following description sets forth one or more exemplary implementations of a Multiple Channel Presenter that incorporate elements recited in the appended claims. These implementations are described with specificity in order to meet statutory written description, enablement, and best-mode requirements. However, the description itself is not intended to limit the scope of this patent.

The inventor intends these exemplary implementations to be examples. The inventor does not intend these exemplary implementations to limit the scope of the claimed present invention. Rather, the inventor has contemplated that the claimed present invention might also be embodied and implemented in other ways, in conjunction with other present or future technologies.

An example of an embodiment of a Multiple Channel Presenter may be referred to as an "exemplary presenter."

Introduction

The one or more exemplary implementations, described herein, of the present claimed invention may be implemented (in whole or in part) by a multi-channel display system 100 and/or by a computing environment like that shown in FIGS. 1, 3, 4, and 5.

With the exemplary presenter, a user may survey the array of multimedia offerings available to her faster than using conventional approaches. Put another way, with the exemplary presenter, a person may channel-surf faster and more efficiently than before.

User-Interface

Figure 1A:
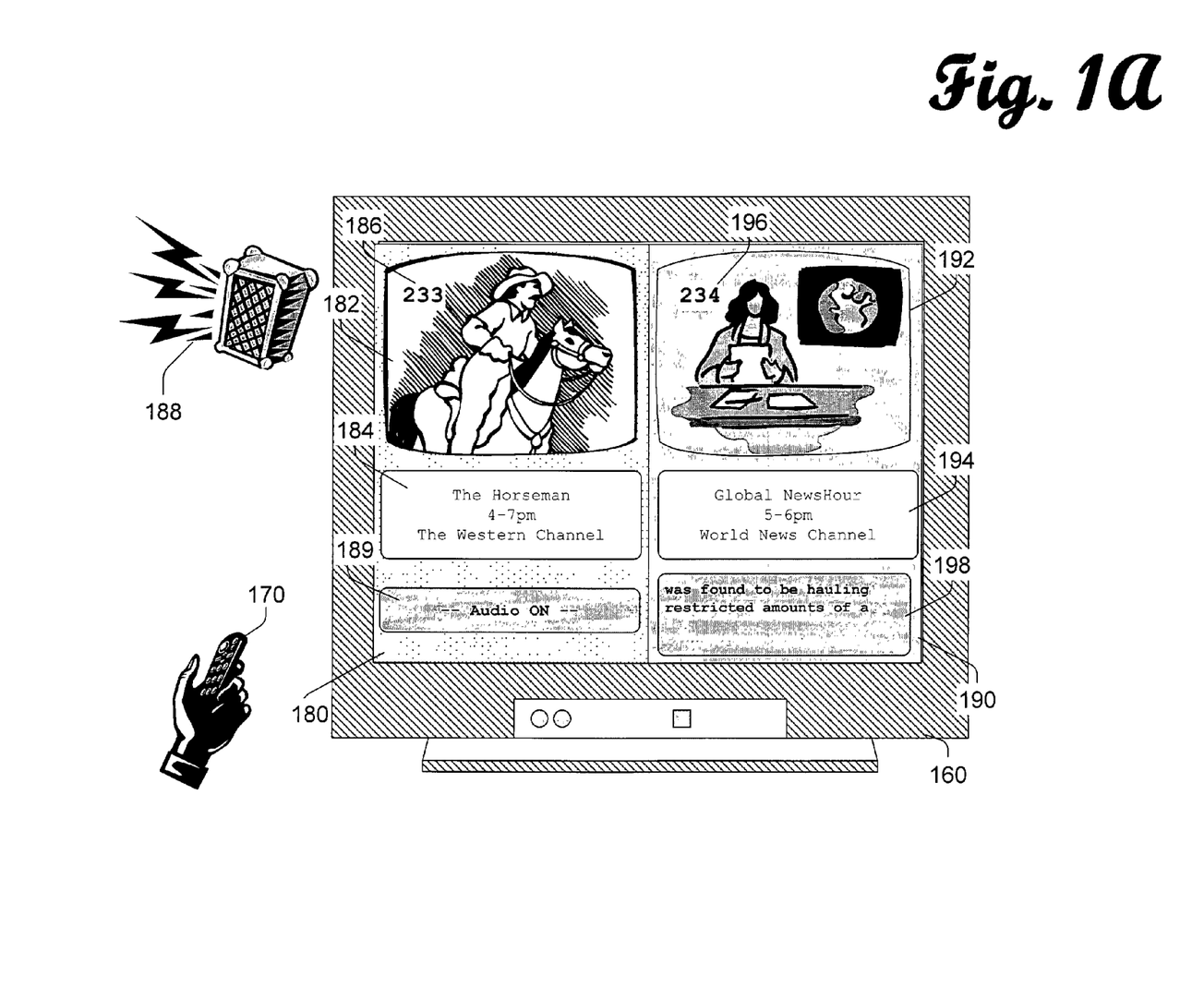
FIG. 1A illustrates an exemplary user-interface (UI) in accordance with an implementation described herein.

FIG. 1A illustrates an example of a "speed-surf" user-interface on television set 160. When channel surfing, a person typically uses a remote control 170. When a person "speed-surfs" using the exemplary presenter, the television set 160 displays a split screen with the left-half 180 displaying information related to one channel and the right-half 190 displaying information about another channel.

Each half simultaneously displays a video stream 182 and 192 of its associated channel. These are not freeze-frames, frame-grabs, or still images from the video streams. Rather, these are, indeed, video stream presentations.

Each half also concurrently displays electronic program guide (EPG) data 184 and 194 about the programs of its associated channel. It also displays the channel number 186 and 196 for its associated channel. Furthermore, each half concurrently provides "audio-based" content 188 and 198 of its associated channel.

Figure 1B:
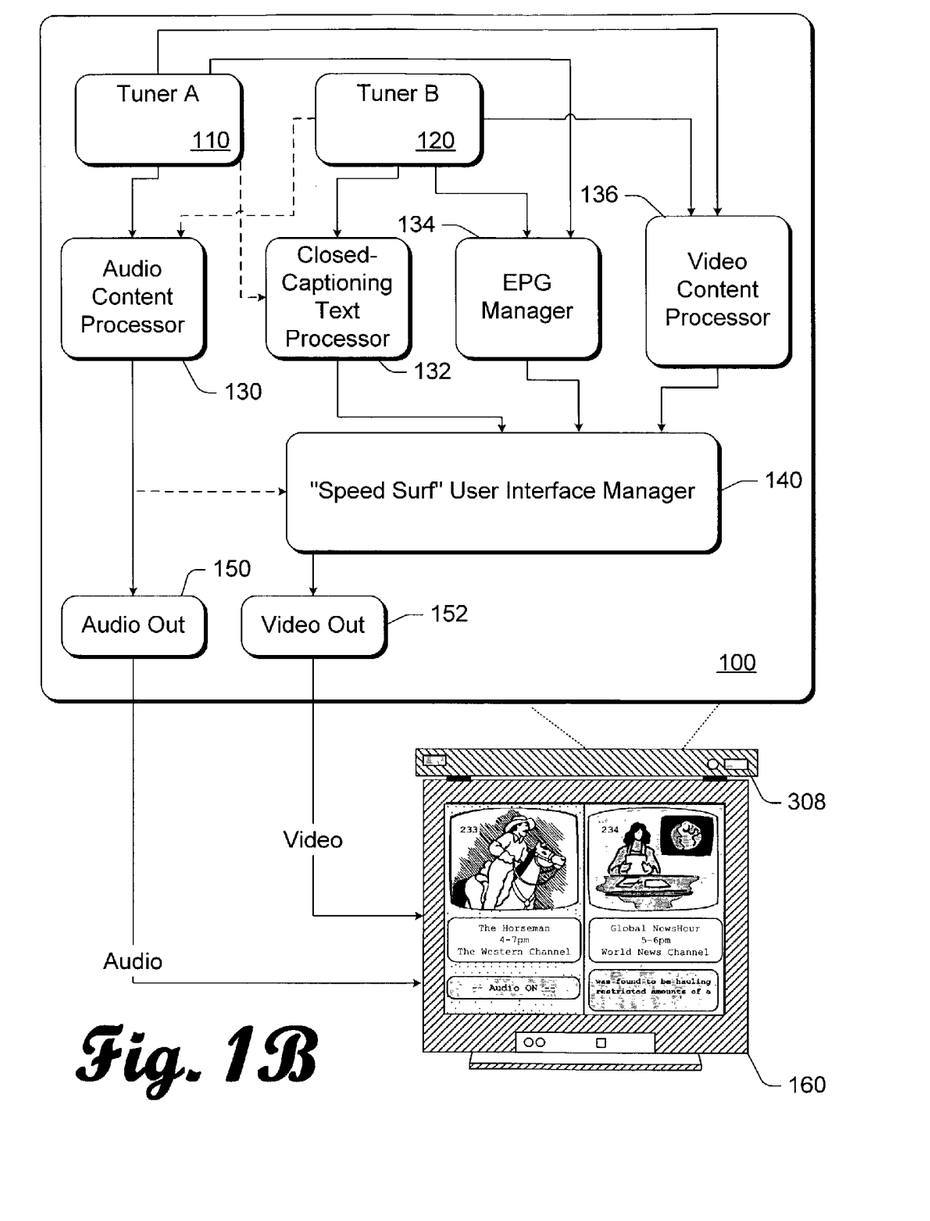
FIG. 1B illustrates an exemplary system in accordance with an implementation described herein.

Herein, "audio-based" content expressly includes audible audio content from speakers and the inaudible closed-captioned ("CC") text, which is transcribed from the audio content. In FIG. 1B, the sound 188 coming out of a speaker represents the audible audio content and text 189 indicates to the user with which channel that this sound is associated. Text 198 is the CC text associated with the channel displayed in the right-half of the UI.

This concurrent presentation of two video streams with their associated audio-based content and the EPG data of their programming allows the user to channel surf at least twice as fast as conventional approaches allow. In addition, the user also gains additional information (via the EPG data) about the programs on the channels being simultaneously displayed.

For example, the television 160 may display both channel 233 and 234 at the same time, with important details about the programs being displayed underneath the broadcast windows, and with their associated audio-based content.

Of course, this is just one exemplary embodiment of the UI. Other embodiments of the UI are within the spirit and scope of this invention.

For example, an alternative UI may have a portion of the television screen may show a video stream of a channel with its associated audio, but not show its associated EPG data. Another will show the video stream of another channel and its associated EPG data. That half may also show its CC text. These portions may be less than half or more than half of the television screen.

Channel Change Button

A traditional television remote control (e.g., remote control 170 of FIG. 1A) has a set of one or more buttons called "channel up" and "channel down." This set will be called, herein, the "change-channel" button. In addition, included in the label of "change-channel" button is any combination of buttons specifically used to key-in a specific channel.

Mechanically, these may be multiple separate buttons, a single rocker-type button, joystick, or anything equivalent. Functionally, pressing one (or more) of these buttons changes the channel to another channel. Typically, that would be a channel immediately above or below it in a defined sequence. For example, channel 4 is immediately above channel 3 in a defined sequence of channels 2, 3, 4, 5, 6, 7, 9, 11, 15, 22, 23, 24, etc.

When channel-surfing using conventional equipment and approaches, one new channel at a time is displayed when the "change-channel" button is pressed. In fact, the new channel typically replaces the just-viewed one.

When speed-surfing using the exemplary presenter, the "change-channel" button on a remote will increment more than one channel at a time. For example, it may increment two channels at a time. If channels 4 and 5 are being displayed and the user presses the "change-channel" button, then channels 6 and 7 are now displayed.

Exemplary Multi-Channel Display System

Many people channel surf, watch a TV guide channel, use a printed guide, or use an interactive program guide to figure out what they want to watch. None of the above listed items displays as much information to the user as the exemplary presenter. Channel surfing is commonplace, but it is slow and the user may not know how long a particular program will be on or what the name of the program is.

FIG. 1B shows the multi-channel display system 100. This system typically is part of a multimedia presentation device (such as device 308 described later).

The multi-channel display system 100 includes tuner A 110 and tuner B 120. Since multiple channels will be displayed concurrently, multiple tuners are used to display them. Alternative embodiments may employ more than two tuners. Furthermore, alternative embodiments may employ fewer tuners than the number of channels displayed if one or more "channels" are actually provided without the need for a tuner. Examples of such "channels" include shows already stored on an on-board storage medium (e.g., a hard drive).

When speed-surfing, the multi-channel display system 100 displays a speed-surf user-interface (UI) on the television set 160. An example of such an UI is shown in both FIGS. 1A and 1B.

Tuner A 110 is tuned to one channel (Channel 233), while tuner B 120 is tuned into next available channel. In this example, this is Channel 234. These channels may be called "multimedia streams."

An audio content processor 130 receives and, if necessary, processes the audio content stream of each channel. Since it might be confusing to audible render the audio content of both channels, the multi-channel display system 100 typically selects the audio content of one of the channels. In this example, the system chooses to emit the sound of channel 233 of Tuner A. It decodes and forwards this audio content to the TV 160 via audio out 150 interface of the system. This selection is indicated by "audio-on" text 189 in FIG. 1A.

The selection of which channel has its "audio-on" may be automatically or manually determined. Alternatively, more than one channel may have audio-on. With this, the sounds may be rendered together or separately rendered in different speakers.

A closed-captioning (CC) text processor 132 receives the closed captioning feed (if available) from Channel 234 (tuned in by tuner B). Although this CC text is not actual audio content, it is audio-based content. In this example, the system chooses to display the CC text of channel 234 of Tuner B. This CC text is shown in box 198 of FIG. 1A.

An electronic program guide (EPG) manager 134 receives EPG data regarding programming on the channels tuned in by tuners A and B. The EPG manager 134 selects some EPG data. In this example, FIG. 1A shows that the system chooses to display the selected EPG data in boxes 184 and 194 in the speed-surf UI.

Common examples of EPG data selected for display:

Channel number

Network name

Program name

Program start and end times

A video content processor 136 receives the video content from turners A and B. These may be called "video feeds." The video content is decoded and rendered to less than their normal size (e.g., half of their normal size). Preferably, this is done without changing their aspect ratio. The generated UI is sent to the television 160 via a video out 152.

With the multi-channel display system 100 shown in FIG. 1B, a Speed-Surf User Interface (UI) manager 140 receives two video feeds, one CC text feed, and two EPG data blocks. The audio content produced by the audio content processor 130 bypasses the speed-surf UI manager 140 because it need not be further managed by it. However, if so desired, the audio content may go through the UI manager 140.

The UI manager 140 generates a user-interface for presentation on the television 160. An example of that UI is shown in both FIGS. 1A and 1B. Typically, the UI will include two video content (e.g., 182 and 192), the CC text content (e.g., 198), and the EPG blocks (e.g., 184, 186, 194, and 196). While the UI displays, the audio content is audibly rendered at 188.

When speed-surfing with the multi-channel display system 100, the user changes channels by pressing a change-channel button on the remote 170. Again, the change-channel button may incrementally change the channel (up or down) or allow a specific channel to be keyed-in.

If a specific channel is keyed-in, then tuner A tunes to the keyed-in channel, and tuner B tunes to the next available channel, which would most likely be one channel above the keyed-in channel.

If a change-channel button increments up one channel, then tuner A tunes to the next incrementally higher available channel that was not currently being displayed. Tuner B tunes to the next available channel above that. If the user had reached the highest available channel number, it would wrap around and tune to the starting channel (e.g., channel 2).

Methodological Implementation of the Exemplary Presenter

Figure 2:
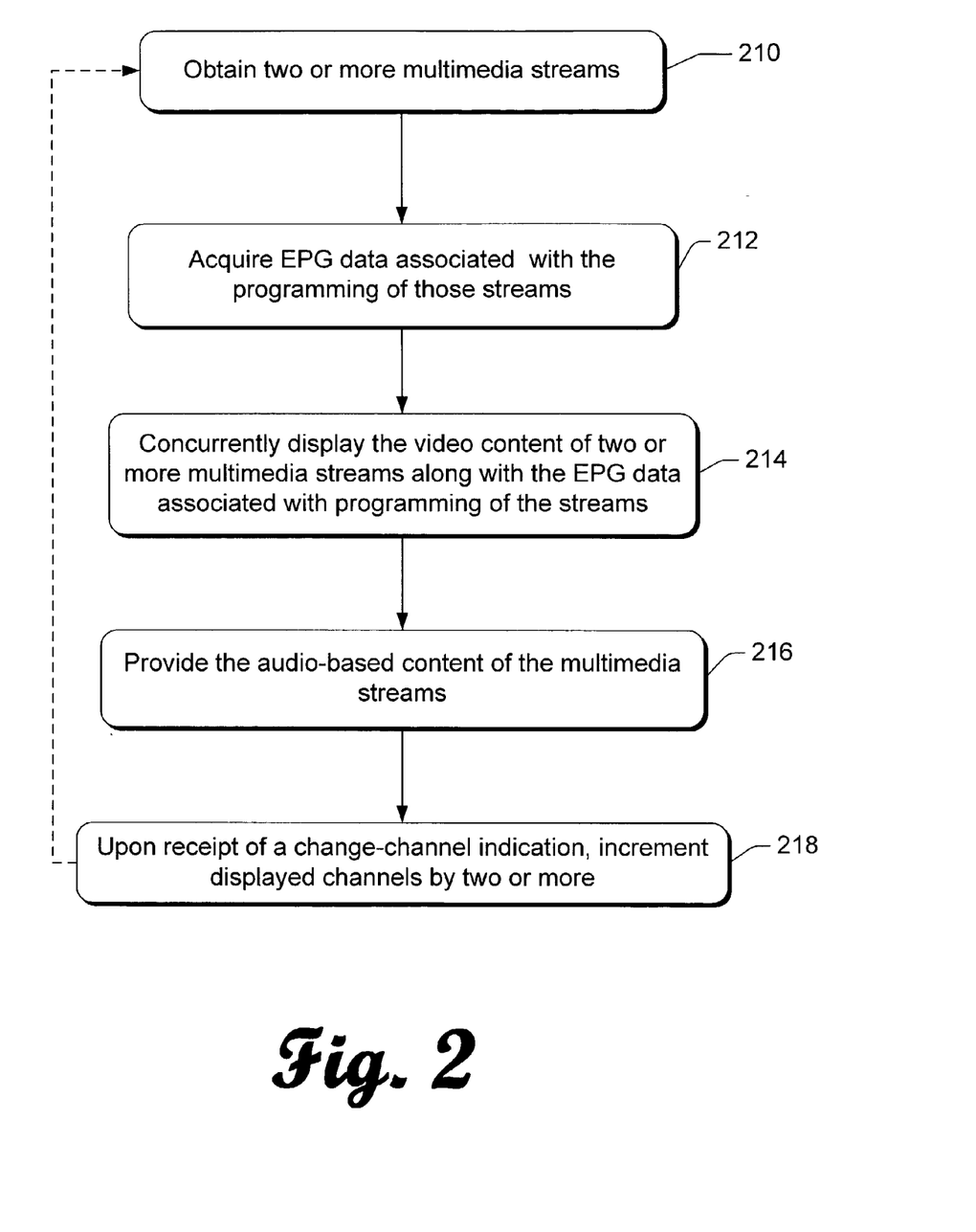
FIG. 2 is a flow diagram showing a methodological implementation described herein.

FIG. 2 shows methodological implementation of the exemplary presenter performed by the multi-channel display system 100 (or some portion thereof). This methodological implementation may be performed in software, hardware, or a combination thereof.

At 210 of FIG. 2, the exemplary presenter obtains two or more multimedia streams. Examples of these are two television channels.

At 212, the exemplary presenter acquires EPG data associated with the programming of the multimedia streams.

At 214, it concurrently displays the video content of the two or more multimedia streams along with the EPG data associated with the programming of those streams.

At 216, the exemplary presenter provides the audio-based content for the two or more multimedia streams. That audio-based content includes actual audio and CC text.

At 218, upon receipt of a change-channel indication, it increments two or more channels and returns to block 210 to repeat the process with the two new multimedia streams (e.g., channels).

Exemplary Environment

Figure 3:
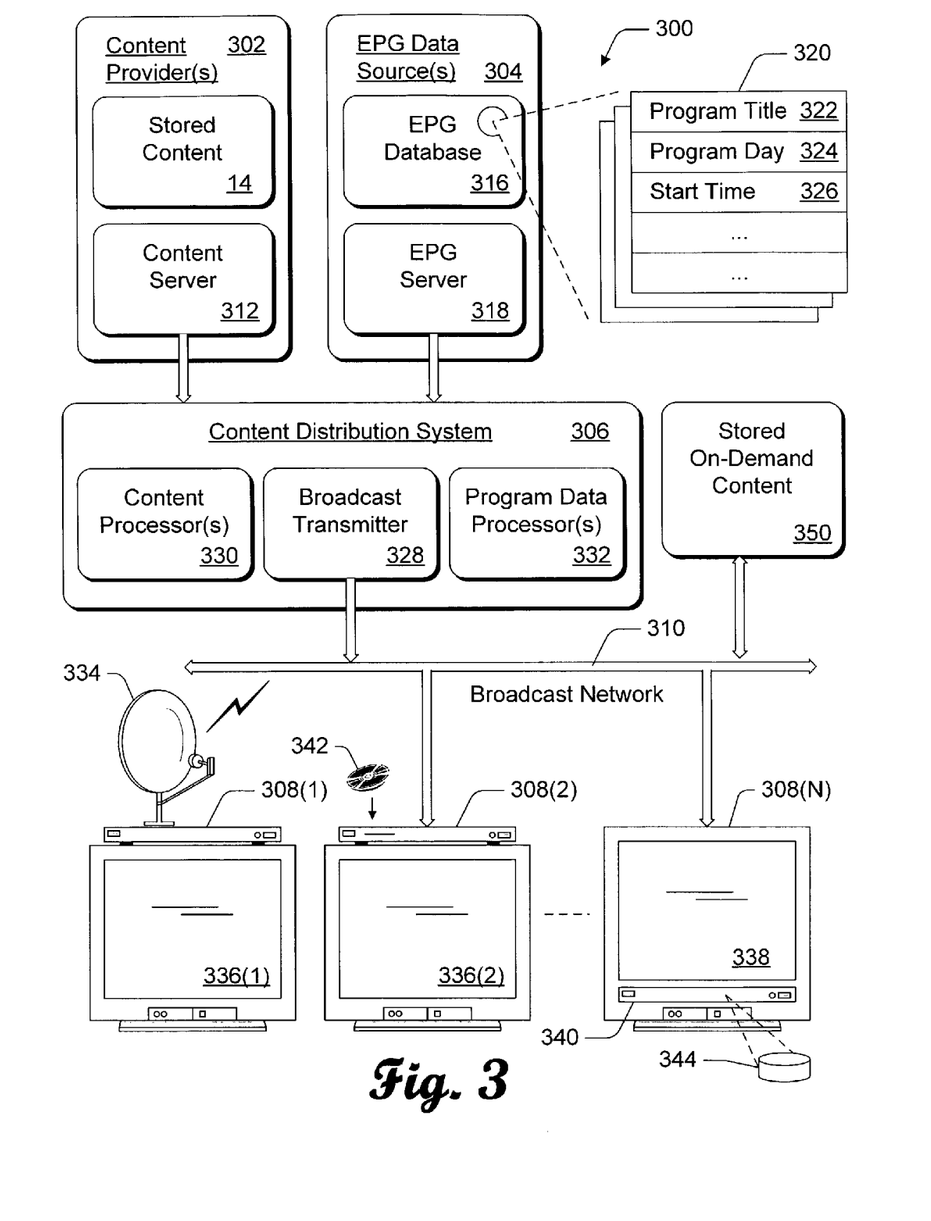
FIG. 3 illustrates an exemplary environment in accordance with an implementation described herein.

FIG. 3 illustrates an exemplary environment 300 in which the techniques, systems, and other aspects described herein may be implemented (partially or wholly). Exemplary environment 300 is a television entertainment system that facilitates distribution of multi-media. A typical digital video broadcast (DVB) network is an example of such an environment.

Multimedia services are available in a variety of forms. The multimedia service might be broadcast content or "broadcast feed" which may include video information as in a television broadcast, audio-only information as in a radio broadcast, or Internet data as in an Internet multicast. Multimedia services may also include access to resources on a network such as a file stored on the network. This resource might be, for example, a Web page or other file remotely stored on a Local Area Network (LAN) or on a Wide Area Network (WAN) such as the Internet.

The environment 300 includes one or more multimedia content providers 302, a content distribution system 306, and one or more presentation devices 308(1), 308(2), . . . , 308(N) coupled to the content distribution system 306 via a broadcast network 310. An example of these presentation devices are Integrated Receiver/Decoders (IRD) devices.

Multimedia content provider 302 includes a content server 312 and stored content 314, such as movies, television programs, commercials, music, and similar audio and/or video content. One or more of the multimedia content providers may be a premium service provider (PS provider).

Content server 312 controls distribution of the stored content 314 from content provider 302 to the content distribution system 306. Additionally, content server 302 controls distribution of live content (e.g., content that was not previously stored, such as live feeds) and/or content stored at other locations to the content distribution system 306.

A remote Electronic Program Guide (EPG) data source 304 includes an EPG database 316 and an EPG server 318. The EPG database 116 stores electronic files of program data 320 which is used to generate an electronic program guide (or, "program guide"). Program data includes program titles, ratings, characters, descriptions, actor names, station identifiers, channel identifiers, schedule information, and so on. The terms "program data" and "EPG data" are used interchangeably herein.

For discussion purposes, an electronic file maintains program data 320 that may include a program title 322, a program day or days 324 to identify which days of the week the program will be shown, and a start time or times 326 to identify the time that the program will be shown on the particular day or days of the week.

The EPG server 318 processes the EPG data prior to distribution to generate a published version of the program data, which contains programming information for all channels for one or more days. The processing may involve any number of techniques to reduce, modify, or enhance the EPG data. Such processes might include selection of content, content compression, format modification, and the like.

The EPG server 318 controls distribution of the published version of the program data from program data provider 304 to the content distribution system 306 using, for example, a file transfer protocol (FTP) over a TCP/IP network (e.g., Internet). Further, the published version of the program data can be transmitted from program data provider 302 via a satellite directly to a presentation device 308.

Each of the sources of program data (such as EPG Source 104) may be called generally called an EPG data source (or remote EPG provider). Examples of EPG data sources include (by way of example only and not limitation):

VoD (Video-on-Demand) providers;
content stored on non-removable storage medium of a DVR (Digital Video Recorder);
content stored on removable storage medium of a DVR;
local television broadcaster;
cable television broadcaster;
satellite television broadcaster;
portable multimedia player (e.g., MP3 player)
data server over a network (e.g., Internet or intranet)

Content distribution system 306 may be coupled to a network, such as an intranet or the Internet. The content distribution system 306 includes a broadcast transmitter 328, one or more content processors 330, and one or more program data processors 332. Broadcast transmitter 328 broadcasts signals, such as cable television signals, across broadcast network 310.

Broadcast network 310 can include a cable television network, RF, microwave, satellite, and/or data network, such as the Internet, and may also include wired or wireless media using any broadcast format or broadcast protocol. Additionally, broadcast network 310 can be any type of network, using any type of network topology and any network communication protocol, and can be represented or otherwise implemented as a combination of two or more networks.

Content processor 330 processes the content received from content provider 302 prior to transmitting the content across broadcast network 310. Similarly, program data processor 332 processes the program data received from program data provider 304 prior to transmitting the program data across broadcast network 310.

A particular content processor 330 may encode, or otherwise process, the received content into a format that is understood by the multiple presentation devices 308(1), 308(2), ..., 308(N) coupled to broadcast network 310. Although FIG. 3 shows a single content provider 302, a single program data provider 304, and a single content distribution system 306, exemplary environment 300 can include any number of content providers and/or program data providers coupled to any number of content distribution systems.

Content distribution system 306 is representative of a headend service that provides EPG data, as well as content, to multiple subscribers. Each content distribution system 304 may receive a slightly different version of the program data that takes into account different programming preferences and lineups.

The EPG server 318 creates different versions of EPG data (e.g., different versions of a program guide) that include those channels of relevance to respective headend services, and the content distribution system 306 transmits the EPG data to the multiple presentation devices 308(1), 308(2), ..., 308(N). In one implementation, for example, content distribution system 106 utilizes a carousel file system to repeatedly broadcast the EPG data over an out-of-band (OOB) channel to the presentation devices 308.

Presentation devices 308 can be implemented in a number of ways. For example, a presentation device 308(1) receives broadcast content from a satellite-based transmitter via a satellite dish 334. Presentation device 308(1) is also referred to as a set-top box or a satellite receiving device. Presentation device 308(1) is coupled to a television 336(1) for presenting the content received by the presentation device (e.g., audio data and video data), as well as a graphical viewer interface. A particular presentation device 308 can be coupled to any number of televisions 336 and/or similar devices that can be implemented to display or otherwise render content. Similarly, any number of presentation devices 308 can be coupled to a single television 336.

Presentation device 308(2) is also coupled to receive broadcast content from broadcast network 310 and provide the received content to associated television 336(2). Presentation device 308(N) is an example of a combination television 338 and integrated set-top box 340. In this example, the various components and functionality of the set-top box are incorporated into the television, rather than using two separate devices. The set-top box incorporated into the television may receive broadcast signals via a satellite dish (similar to satellite dish 334) and/or via broadcast network 310. In alternate implementations, presentation devices 308 may receive broadcast signals via the Internet or any other broadcast medium.

Each presentation device 308 runs various applications that utilizes the program data. One of these applications may be an implementation of the exemplary presenter.

Presentation device 308 may access video from a removable storage medium 342, such as a DVD disk. Also, presentation device 308 may access video from a non-removable storage medium 344, such as an internal hard drive. The device provides the multimedia content from the storage media to an associated television. The device may extract program data from the storage media. Examples of such a presentation device include DVD player, a personal video recorder, etc.

The exemplary environment 300 also includes on-demand content provider 350, such as Video On-Demand (VoD) providers. it may provide stored on-demand content for viewing via a presentation device 308 through an onscreen movie guide, such as an EPG user interface.

Herein, a multimedia presentation system may implemented as part of the exemplary environment 300. For example, it may be implemented as part of a presentation device 308.

Exemplary Presentation Device

Figure 4:
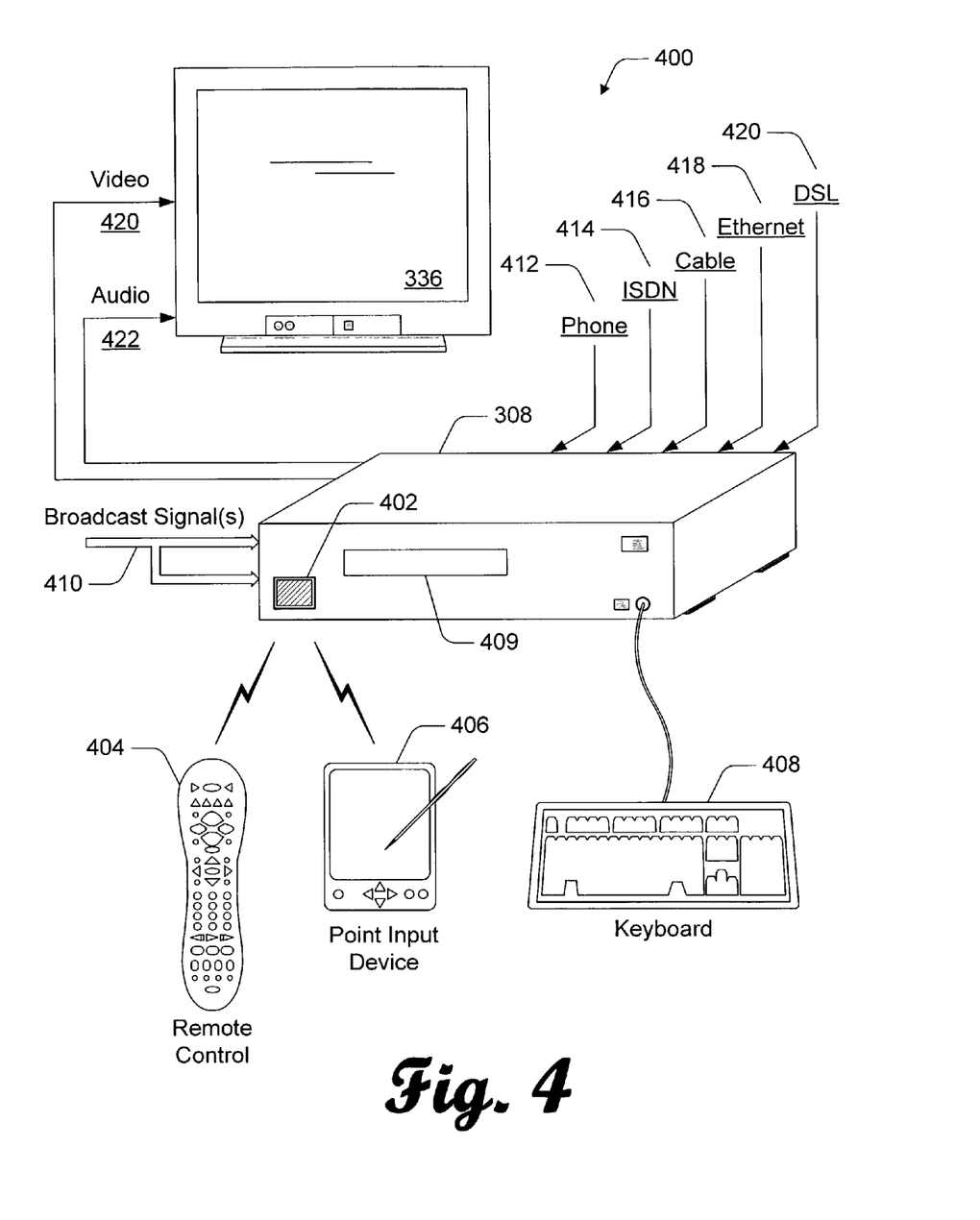
FIG. 4 illustrates of an example presentation device, a television, and various input devices that interact with the presentation device. The presentation device, television, and input devices are in accordance with an implementation described herein.

FIG. 4 illustrates an exemplary implementation 400 of a presentation device 308 shown as a standalone unit that connects to a television 336. Presentation device 308 can be implemented in any number of embodiments, including as a set-top box, a satellite receiver, a TV recorder with a hard disk, a game console, an information appliance, a DVD player, a personal video recorder, and so forth.

Presentation device 308 includes a wireless receiving port 402, such as an infrared (IR) or Bluetooth wireless port, for receiving wireless communications from a remote control device 404, a handheld input device 406, or any other wireless device, such as a wireless keyboard. Handheld input device 406 can be a personal digital assistant (PDA), handheld computer, wireless phone, or the like. Additionally, a wired keyboard 408 is coupled to communicate with the presentation device 308. In alternate embodiments, remote control device 404, handheld device 406, and/or keyboard 408 may use an RF communication link or other mode of transmission to communicate with presentation device 308.

Presentation device 308 may have a storage medium reader 409 for reading content storage media, such as DVD disks or a hard drive.

Presentation device 308 may receive one or more broadcast signals 410 from one or more broadcast sources, such as from a satellite or from a broadcast network. Presentation device 308 includes hardware and/or software for receiving and decoding broadcast signal 410, such as an NTSC, PAL, SECAM or other TV system video signal.

Presentation device 308 also includes hardware and/or software for providing the viewer with a graphical viewer interface by which the viewer can, for example, access various network services, configure the presentation device 308, and perform other functions.

Presentation device 308 may be capable of communicating with other devices via one or more connections including a conventional telephone link 412, an ISDN link 414, a cable link 416, an Ethernet link 418, a DSL link 420, and the like. Presentation device 308 may use any one or more of the various communication links 412-420 at a particular instant to communicate with any number of other devices.

Presentation device 308 generates video signal(s) 420 and audio signal(s) 422, both of which are communicated to television 336. The video signals and audio signals can be communicated from presentation device 308 to television 336 via an RF (radio frequency) link, S-video link, composite video link, component video link, or other communication link.

Although not shown in FIG. 4, presentation device 308 may include one or more lights or other indicators identifying the current status of the device. Additionally, the presentation device may include one or more control buttons, switches, or other selectable controls for controlling operation of the device.

Figure 5:
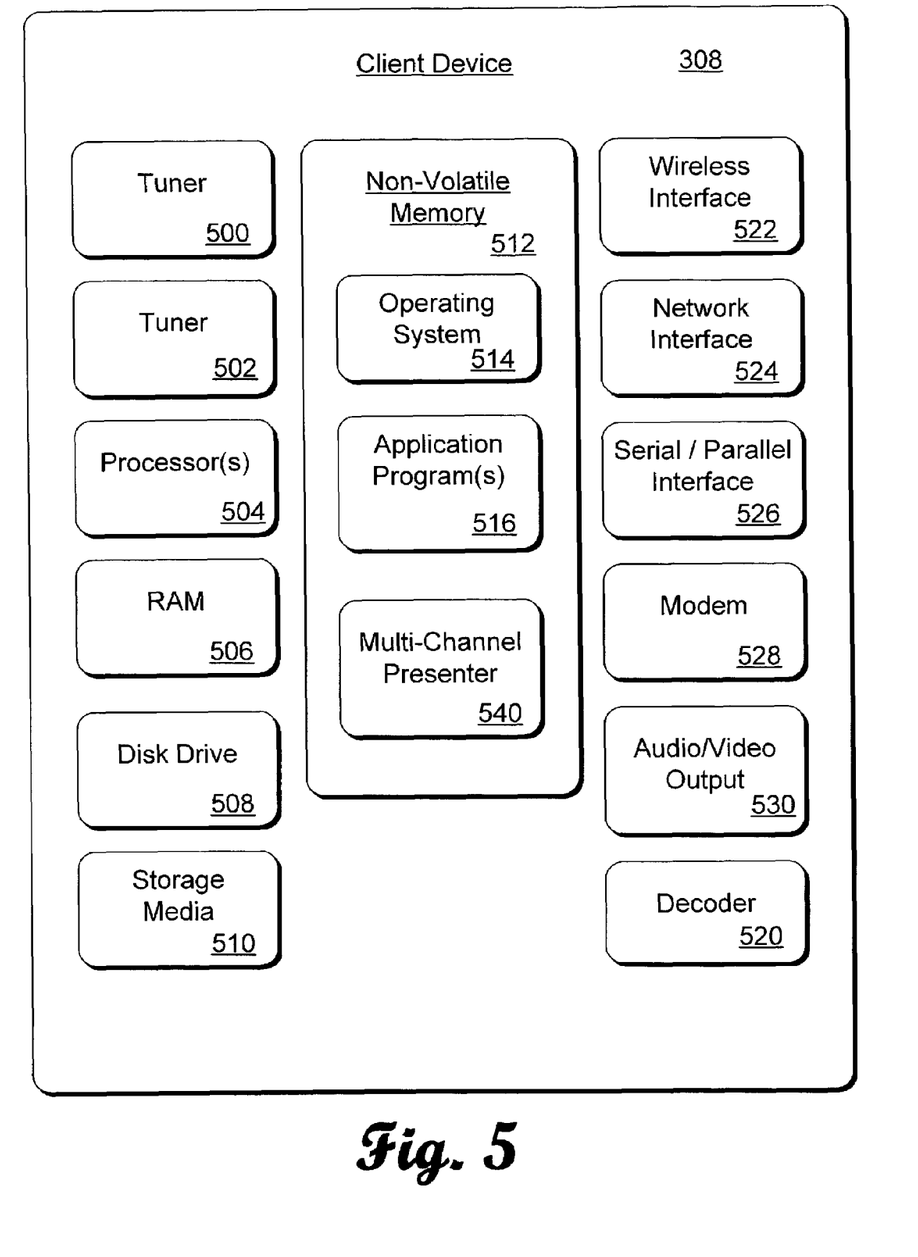
FIG. 5 is a block diagram that illustrates components of the example presentation device(s) shown in FIGS. 3 and 4. The components are in accordance with an implementation described herein.

FIG. 5 illustrates selected components of presentation device 308 shown in FIGS. 3 and 4. Presentation device 308 includes a first tuner 500 and an optional second tuner 502. These tuners may be called the receiving unit. The tuners 500 and 502 are representative of one or more in-band tuners that tune to various frequencies or channels to receive television signals, as well as an out-of-band tuner that tunes to the broadcast channel over which other content may be broadcast to presentation device 308.

Presentation device 308 also includes one or more processors 504 and one or more memory components. Examples of possible memory components include a random access memory (RAM) 506, a disk drive 508, a mass storage component 510, and a non-volatile memory 512 (e.g., ROM, Flash, EPROM, EEPROM, etc.).

Alternative implementations of presentation device 308 can include a range of processing and memory capabilities, and may include more or fewer types of memory components than those illustrated in FIG. 5.

Processor(s) 504 process various instructions to control the operation of presentation device 308 and to communicate with other electronic and computing devices. The memory components (e.g., RAM 506, disk drive 508, storage media 510, and non-volatile memory 512) store various information and/or data such as multimedia content, electronic program data, web content data, configuration information for presentation device 308, and/or graphical viewer interface information. The device may cache data into any one of these many memory components.

An operating system 514 and one or more application programs 516 may be stored in non-volatile memory 512 and executed on processor 504 to provide a runtime environment. A runtime environment facilitates extensibility of presentation device 308 by allowing various interfaces to be defined that, in turn, allow application programs 516 to interact with presentation device 308.

In the illustrated example, an EPG application 518 is stored in memory 512 to operate on the EPG data and generate a program guide. The application programs 516 that may be implemented on presentation device 308 can include, for example, a browser to browse the Web, an email program to facilitate electronic mail, and so on.

Presentation device 308 can also include other components pertaining to a television entertainment system which are not illustrated in this example for simplicity purposes. For instance, presentation device 308 can include a user interface application and user interface lights, buttons, controls, etc. to facilitate viewer interaction with the device.

Presentation device 308 also includes a decoder 520 to decode a broadcast video signal, such as an NTSC, PAL, SECAM or other TV system video signal. Presentation device 308 further includes a wireless interface 522, a network interface 524, a serial and/or parallel interface 526, and a modem 528. Wireless interface 522 allows presentation device 308 to receive input commands and other information from a user-operated input device, such as from a remote control device or from another IR, Bluetooth, or similar RF input device.

Network interface 524 and serial and/or parallel interface 526 allows presentation device 308 to interact and communicate with other electronic and computing devices via various communication links. Although not shown, presentation device 308 may also include other types of data communication interfaces to communicate with other devices. Modem 528 facilitates presentation device 308 communication with other electronic and computing devices via a conventional telephone line.

Presentation device 308 also includes an audio/video output 530 that provide signals to a television or other device that processes and/or presents or otherwise renders the audio and video data. This output may be called the display.

Presentation device 308 also includes an additional component: a Multi-channel Presenter 540. This component partially or wholly implements the exemplary presenter. This component may be an application program or a hardware component.

Although shown separately, some of the components of presentation device 308 may be implemented in an application specific integrated circuit (ASIC). Additionally, a system bus (not shown) typically connects the various components within presentation device 308.

A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer-Executable Instructions

An implementation of an exemplary presenter may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of an exemplary presenter may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EPPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. In a multimedia presentation system, a computer storage medium having computer-executable instructions that, when executed, directs a computer to perform a method comprising:
concurrently obtaining two or more multimedia streams from one or more sources distinct from the multimedia presentation system, wherein each stream has programming associated therewith and each stream has a source-indicating identifier associated therewith, the source-indicating identifier of each stream identifying its source, each concurrently obtained stream being received by a distinct tuner;
acquiring electronic program guide (EPG) data of the programming associated with the streams;
concurrently presenting:
video content of two or more of the concurrently obtained streams wherein the video content of each concurrently presented stream is part of the programming associated therewith;
audio-based content of two or more of the streams, the audio-based content including audible content rendered to a sound device and inaudible closed-captioned text, which is transcribed from the audio content, displayed on a screen, the concurrently presenting audio-based content of two or more of the streams comprises:
selecting a first stream having its audible sound rendered in the sound device:
displaying a text indicating the first stream that has its audible sound rendered in the sound device in the EPG data;
rendering the audible sound of the first stream; and
displaying one or more inaudible closed-caption texts associated with the other one or more streams in the associated EPG data;
selecting two or more streams having their audible sounds rendered in the sound device:
concurrently rendering the audio-based content of two or more streams in distinct speakers;
the EPG data of the associated programming of two or more of the concurrently presented streams, wherein the concurrently presented EPG data includes data other than merely the source-indicating identifiers which identify the concurrently presented streams;
receiving a change-channel indication;
upon receipt of a change-channel indication of incrementing up one channel:
repeating the obtaining, acquiring, and presenting with two or more new concurrently obtained multimedia streams;
tuning a first stream to a next incrementally higher available channel that was not currently being displayed; and
tuning a second and later streams to a corresponding next available channel in sequence,
in an event that a stream has reached the highest available channel number, tuning the stream to a channel at a starting position; and
upon receipt of a change-channel indication of tuning the first stream to a specific channel:
repeating the obtaining, acquiring, and presenting with two or more new concurrently obtained multimedia streams;
tuning the first stream to the specific channel; and
tuning a second and later streams to a corresponding next available channel in sequence,
in an event that a stream has reached the highest available channel number, tuning the stream to a channel at a starting position.

2. A medium as recited in claim 1, wherein the obtaining comprises tuning to one or more broadcast channels.

3. A medium as recited in claim 1, wherein the audio-based content of a multimedia stream is selected from a group comprising audible sound from that stream and closed-captioned text from that stream.

4. A medium as recited in claim 1, wherein the EPG data of the associated programming of a stream is selected from a group comprising includes program titles, ratings, characters, descriptions, actor names, schedule information, network name, and program start and end times.

5. A medium as recited in claim 1, wherein the presenting comprises visibly displaying and audibly rendering.

6. A medium as recited in claim 1, wherein the presenting comprises visibly displaying the video content and a textual portion of the audio-based content and audibly rendering an audible portion of the audio-based content.

7. A presentation device comprising:
an audio output unit;
a visual output unit;
a medium as recited in claim 1.

* * * * *